United States Patent [19]
Lühmann et al.

[11] Patent Number: 5,538,054
[45] Date of Patent: Jul. 23, 1996

[54] METHOD AND APPARATUS FOR FILLING TRANSPARENT BEVERAGE RECEPTACLES

[75] Inventors: Peter Lühmann; Carus von Karstedt, both of Hamburg; Norbert Basler, Hoisdorf; Wilfried Kolbe, Gülzow, all of Germany

[73] Assignee: APV Ortmann & Herbst GmbH, Hamburg, Germany

[21] Appl. No.: 202,907

[22] Filed: Feb. 28, 1994

[30] Foreign Application Priority Data

Feb. 27, 1993 [DE] Germany ............. 43 06 120.6

[51] Int. Cl.$^6$ ..................................... B65B 3/04
[52] U.S. Cl. .............. 141/198; 141/1; 141/145; 141/95; 340/619
[58] Field of Search ............... 141/1, 5–7, 128, 141/129, 94, 95, 139, 140, 144, 145, 153, 156, 157, 192, 198; 340/619

[56] References Cited

U.S. PATENT DOCUMENTS

| | | | |
|---|---|---|---|
| H297 | 7/1987 | Schultz | 141/232 |
| 4,206,788 | 6/1980 | Susaki et al. | 141/1 |
| 4,402,350 | 9/1983 | Ehret et al. | 141/94 |
| 4,691,496 | 9/1987 | Anderson et al. | 141/95 X |
| 4,733,095 | 3/1988 | Kurahashi et al. | 340/619 X |
| 4,880,039 | 11/1989 | Horak | 141/1 |
| 5,016,684 | 5/1991 | Clusserath | 141/6 |

*Primary Examiner*—J. Casimer Jacyna
*Attorney, Agent, or Firm*—Walter C. Farley

[57] ABSTRACT

Rotary beverage receptacle-filling apparatus for transparent receptacles has a plurality of receptacle sites spaced apart at its periphery with filling components with electrically driven controls controlling the flow of beverage. Stationary video cameras next to the apparatus measure the filling level in the receptacles near a level limit and to produce closing signals to the flow controls of those receptacle sites at which a receptacle reaches a limit level leading to the desired nominal level, if necessary taking into account any post-flow. One video camera covering several receptacle sites is provided as the measuring device and is connected to an image analyzer driving all controls. The analyzer continuously monitors the observed receptacles while also ascertaining the angular positions of receptacle sites associated with them, measuring the particular filling level reached in several angular positions and, when the limit level is reached in a receptacle, transmitting the closing signal to the control of the associated receptacle site.

13 Claims, 4 Drawing Sheets

METHOD AND APPARATUS FOR FILLING TRANSPARENT BEVERAGE RECEPTACLES

CROSS-REFERENCE TO RELATED APPLICATION

Reference is made to copending, commonly-owned application Ser. No. 08/202,906, entitled Volumetric Beverage Receptacle Filling Apparatus and Method, filed concurrently herewith, which is hereby incorporated by reference for all purposes.

FIELD OF THE INVENTION

The invention relates to beverage receptacle-filling apparatus for use with transparent receptacles to receive liquid beverage.

BACKGROUND OF THE INVENTION

For economic reasons, rotary beverage receptacle-filling apparatus is operated at the limit of output, that is, at very high rates. In the process, problems arise in accurately maintaining the desired nominal filling level in the receptacles. A number of methods of monitoring the filling procedure are known from the state of the art.

German patent document 30 36 294 A1 describes beverage receptacle-filling apparatus comprising devices in the filling means to measure the flow, i.e., the rate at which liquid passes, these devices feeding their values to a central computer which calculates the time for terminating flow and at that time closes flow control members. In addition a monitoring device for the filling level in the form of a measuring stop is present at the discharge of the beverage receptacle-filling apparatus to feed correction values to the computer for regulating the filling components. The drawback of this design is that each filling component must be fitted with flowmeters.

Beverage receptacle-filling apparatus also is known from German patent document 31 50 183 C1 which also comprises a filling level monitor at the discharge. In this design an analyzer identifies those filling components that are filling improperly. This design does not provide control of the filling level.

Designs described in German patent document 32 18 062 A1 are widely used in the state of the art, each filling component comprising a probe dipping into the receptacle to measure the filling level. When reaching the limit level, the probe actuates a control driving the flow of beverage. This design also incurs the drawback of substantial complexity for each of the filling components which, in conventional beverage receptacle-filling apparatus, are present in large numbers.

Another apparatus is shown in German patent document 31 15 957 A1 in which meters for the filling level are stationary next to the beverage receptacle-filling apparatus and are able to transiently operate on the passing receptacles. If the limit level has been reached in one of the sensed receptacles, then a transmitter located in the same angular position as the meter transmits a closing control signal to a receiver which at this time is directly adjacent to the filling component of the beverage receptacle-filling apparatus.

Such a system can sense a receptacle only transiently in a specific angular position relative to the beverage receptacle-filling apparatus. If there were only one such system, then it would only determine each time that the filling level is too high or too low. In this system, therefore, such systems must be mounted next to one another in large numbers to allow detecting the nominal level having been reached in at least one system when monitoring the slowly rising filling level of several receptacles passing such an arrangement.

This design incurs the drawback of the large hardware cost caused by the plurality of complex systems and the receivers required at each filling component.

Lastly the use of video cameras with image analyzers is known for purposes other than those stated herein. Illustratively, as shown in German patent document 32 12 432 C2, inspection means preceding or following beverage receptacle-filling apparatus may monitor receptacles for intactness, filling state or the like, and according to the German patent document 40 30 081 A1, they may monitor the foaming conditions inside receptacles following the beverage receptacle-filling apparatus in order to control the foaming process. In this state of the art the video cameras always are designed and mounted in such a way that they cover only one receptacle at a time.

SUMMARY OF THE INVENTION

An object of the present invention is to provide a beverage receptacle-filling apparatus that is simple in design and yet allows high-accuracy filling.

In accordance with the invention, the filling level measuring device is a stationary video camera simultaneously viewing several receptacles in its field of view. Each passing receptacle is monitored for some time within the camera field of view and during that time interval, the rising level of liquid can be monitored continuously. Accordingly, the receptacle being continuously watched for some time, it is possible to ascertain with high accuracy the right time when the nominal filling level will be or is being reached. An image analyzer used for these purposes is connected to control means for all the filling components and, by means of appropriate devices or corresponding image analysis, this analyzer knows the site of that filling component which has just reached the limit level. The image analyzer is able to close this filling component at the right time with high precision. The very high accuracy of filling of the invention compared with that of the state of the art and furthermore the lesser apparatus complexity are advantageous. The filling components require no devices measuring the filling level or other filling parameters, and consequently the cost of the beverage receptacle-filling apparatus is reduced substantially. The expense of video cameras with image analyzers is almost negligible considering present-day computer costs, the more so because beverage receptacle-filling apparatus is usually provided with data-processing control systems which can be used for the present purposes without significantly adding to the cost. No additional costs need be incurred to detect a filling component associated with a detected receptacle, such as by detecting optical markings at the filling components or by counting the filling components and comparing with a fixed marking at the periphery of the beverage receptacle-filling apparatus. Moreover the video camera with image analyzer may be advantageously used for other monitoring purposes, making it more useful at no additional cost.

The filling level in a receptacle passing the camera may be monitored continuously or at particular points only.

By monitoring a receptacle and determining several filling levels at different angular positions, the filling level of intermediate angular positions can be interpolated and also it may be extrapolated beyond the specific range. Accordingly, the angular position at which the limit level is being reached can be ascertained without requiring image analysis at that specific angular position. The number of required image analyses can be reduced and hence also the computation needed for image analysis. The rate of filling also can be calculated from the filling levels at different angular positions. The receptacle filling-rate so ascertained can be used for instance to continuously adjust the associated control means to arrive at the desired filling-rate in the receptacle or to determine defectively behaving filling components, for instance control means.

In accordance with the invention, it is possible to fill faster up to a given level and thereafter to fill more slowly and hence more precisely up to reaching the limit level. The lower level and the limit level advantageously are covered by the field of view of the same video camera.

Image analysis being carried out on the receptacles in the camera field-of-view over some time, that is over a given peripheral angle of the beverage receptacle-filling apparatus, detection of the limit level in the field of view is also assured if there are differences between the filling components, namely when these are filling more rapidly or more slowly and thus when the limit levels are reached earlier or later. Nevertheless, if the deviations among filling components or in particular when adjusting the beverage receptacle-filling apparatus angular speed, and hence (with the filling time constant), the changing peripheral angles required for filling, cases may arise when the nominal level lies outside the camera's field of view.

If the image analyzer senses that in the range monitored by the camera the filling levels are too low in all filling components, then the initial angle at which filling commences is advanced or, if such a step is inadequate, the apparatus angular speed is lowered until the camera ascertains that the nominal level is being reached. If the receptacles in the monitored range are overfilled, then the initial angle is delayed. Thereby, the camera reliably always is capable of detecting that the nominal level is being reached and hence to cause closure of the control means. Furthermore, a changeover of the apparatus to other receptacle sizes or other liquids, whereby other filling times are required, can be taken into account in wholly automated manner.

If the opening signals for the control means of the filler components are emitted individually in relation to the angular position of the filling limit stop determined in the previous revolution, then, in a simple manner, even coarser manufacturing tolerances of the filler components can be taken into account in such manner that all filler components can close at the same angular position of the bottle-and-can beverage receptacle-filling apparatus.

For this kind of control applied to the beginning of filling, preferably the filling components being individually controlled, the time of closing of the filling components can be delayed as much as possible, while taking into account the time required for the subsequent processing such as pressure relief, to make optimal use of the time interval available for filling, while avoiding the possibility that overdue closing of a filling component might result in faulty filling.

Substantial angular shifts of the apparatus angular sector (filling sector) available for filling may be taken into account by shifting a camera, these shifts being required, for example, when switching to different receptacle sizes.

As an alternative, several cameras may be used to sweep across illustratively overlapping angular ranges.

On account of the two possible modes, wider angular sectors may be covered while maintaining the required resolution. Furthermore the filling levels may be ascertained at other locations of the apparatus, for instance in the sloshing-susceptible direction-changing areas at the discharge starwheel.

Devices for continuously determining the angular position of the beverage filling apparatus may be present in a conventional manner, for instance using light beams scanning markings at the apparatus periphery, or the like. If each time, that is with each required image analysis, the apparatus position is fed to the image analyzer, then the image analysis can be reduced substantially because the instantaneous angular positions of the receptacle sites can be calculated from the transmitted apparatus angular position.

Illustratively the filling parameter is the filling rate or the ascertained circumferential angle when a given level is being reached. Filling components ascertained to be defective may be shut down with respect to further operation. Slighter deviations can be detected and stored so as to be taken care of during the next machine overhaul. Furthermore, once the limit level has been reached, one may check how much higher the filling level in the receptacle still will rise. This check allows rating the closing quality of the filling component and if found proper, how much liquid will be in excess.

Monitoring receptacle sites for the presence of receptacles permits determination of, for instance, the bottles bursting on the receptacle sites. Because receptacles may burst during their full revolution about the filling apparatus, cameras are advantageously mounted in sufficient numbers around this apparatus.

While in the pressure relief sector of the filling apparatus, that is during the decompression or depressurizing in the receptacle, a video camera may monitor the rise in foam through its field of view and thereupon it may control the pressure relief procedure, for instance by throttles at the filling components. Further rise in foam also may be monitored in receptacle-delivering devices following the filler apparatus such as in the discharge starwheel or from a subsequent conveyor belt to regulate the foam precisely to the receptacle edge to prevent loss of foam and to prevent entry of air into the foam-filled head space of the receptacle. It is possible thereby also to maintain the accuracy of adjusted nominal level achieved by the invention at the discharge of the filling apparatus and to be secure against foaming and sloshing losses. Moreover this camera may serve as a final check of the filling level.

BRIEF DESCRIPTION OF THE DRAWINGS

The invention is shown illustratively and schematically in the accompanying drawings wherein.

DESCRIPTION OF THE PREFERRED EMBODIMENT

Figure 1:
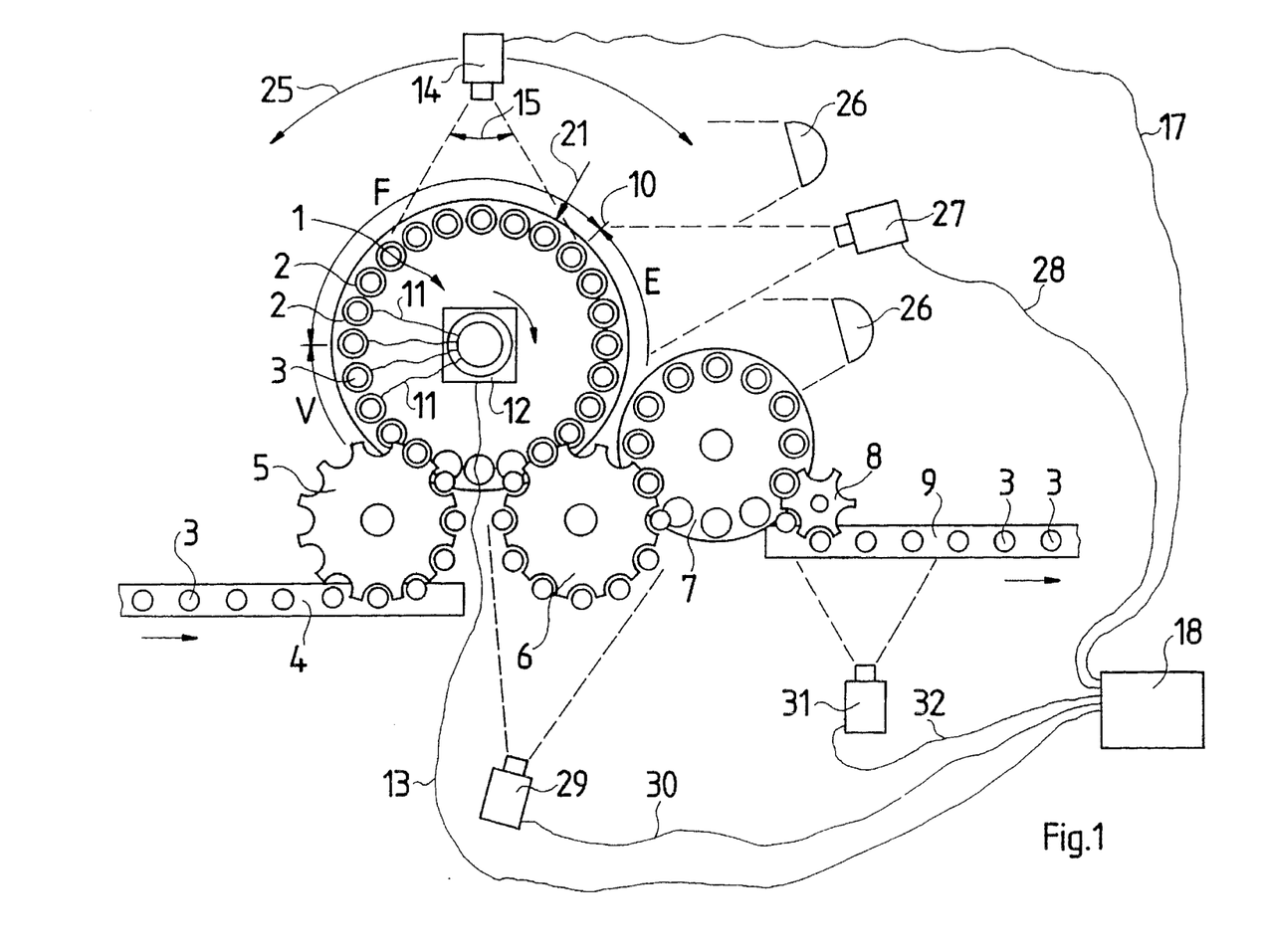
FIG. 1 is a simplified schematic top view of a beverage receptacle-filling apparatus fitted with several video cameras.

FIG. 1 is a top view of a beverage receptacle-filling apparatus including a rotary receptacle carrier 1 of conventional design. The carrier rotates clockwise. Receptacle sites 2 are uniformly spaced about the periphery of the carrier.

Receptacles 3 are delivered by a conveyor belt 4 and fed through an intake starwheel 5 to filling apparatus carrier 1.

The receptacles 3 moved around carrier 1 on receptacle sites 2 and are removed from the carrier by a discharge starwheel 6 from which they are conventionally transferred to a rotating sealing device 7. Receptacles 3 leave sealing device 7 through a discharge starwheel 8 onto a conveyor belt 9.

Details of the filling apparatus 1 which are not relevant to the invention are omitted herein. Illustratively, each of the receptacle sites 2 is conventionally fitted with a table or saucer supporting a receptacle which is typically a bottle. A filling apparatus is located above each receptacle site and typically is lowered onto each receptacle in a sealing relationship for purposes of filling. The filling devices are not shown and are well-known in this art, one being associated with each receptacle site 2. They comprise conventional devices which, for instance, when filling with carbonated beverages, first pressurize the receptacles with gas and thereupon, after a control means such as a valve has been opened, feed liquid into the container. The control means is then closed and the receptacle is depressurized before it is allowed to leave the filling apparatus.

FIG. 1 shows a beverage receptacle-filling apparatus with which the receptacle first is pressurized and then is depressurized. Angular sectors are shown in FIG. 1 in which various steps take place including a pressurizing sector V, an adjoining filling sector F and a subsequent depressurizing sector E. The end of the filling sector, namely that angular position at the periphery of the filling apparatus where filling must terminate so that the time required for decompressing the receptacles be available, is denoted by 10.

The control means for the filling components of the individual receptacle sites 2 are driven electrically in the shown beverage receptacle-filling apparatus 1. The control means, typically a valve controlling flow of the liquid, may be driven pneumatically. To make possible remote control however, the pneumatics is driven electrically. The drive is implemented through cables 11 that run from the receptacle sites 2 to a rotary feed-through 12 on the shaft of the filling apparatus 1 and from there are externally powered by a common control cable 13. The cables may be buses, for instance, from which the receptacle sites 2 may be actuated by means of suitable control addresses to individually open and close the control means of the associated filling components. The control cables 11, 13 also allow remotely controlling other functions of the filling components, such as pressurizing in pressurization sector V and depressurization in depressurizing sector E.

The receptacles stand in receptacle sites 2 as they pass through filling sector F. The level of liquid in each receptacle gradually rises in the process until it reaches the limit level near the end of the filling sector F, at which time the control means for the associated filling component must be closed in order that the desired nominal level in the receptacle be achieved, allowance being made where necessary for any post-flow. To ascertain that the limit level in the receptacles has been reached and then to emit a closing signal through the cables 11 and 13 to the corresponding receptacle site 2, use is made of a first video camera 14 shown in FIG. 1 which is stationarily mounted outside the filling apparatus.

Figure 2:
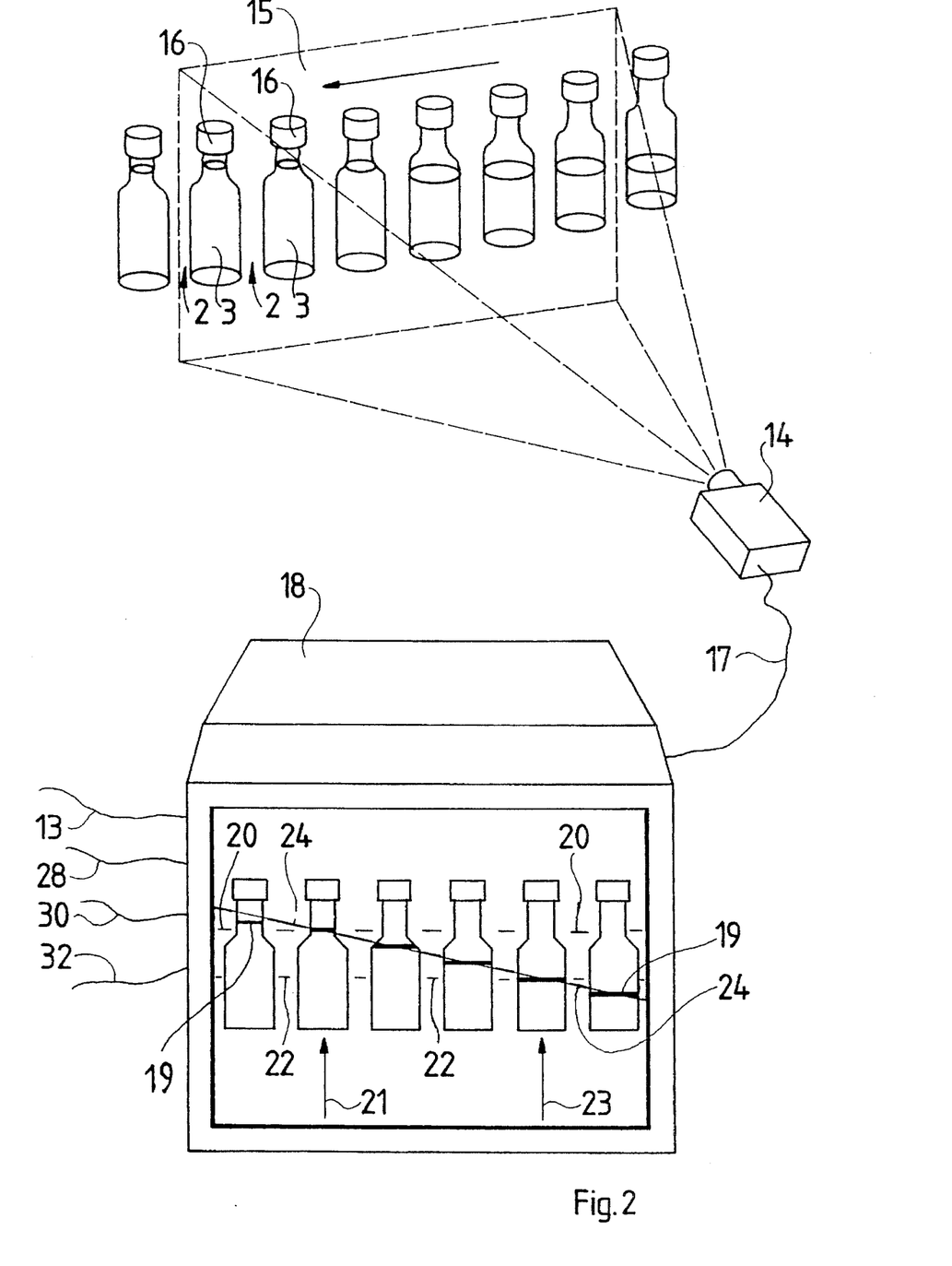
FIG. 2 is a video camera with its field of view and the display on a monitor.

The first video camera is mounted in such manner that its field of view 15, shown in dashed lines in FIGS. 1 and 2, encompasses the receptacle sites 2 with which it is approximately level, the field of view including an angular range which encompasses the end area of filling sector F, that is, that area wherein stoppage of filling must occur.

FIG. 2 shows the first-mentioned video camera 14 and its field of view 15 covering six receptacle sites 2. The shown receptacles 3 are held in sealed manner against a filling components 16 shown in simplified schematic form. The remaining parts of the associated receptacle sites 2 are omitted for clarity. An arrow indicates the direction in which the receptacles 3 move through the field of view 15. The receptacles 3 (bottles) and the filling levels 19 shown therein are indicated so as to provide an overview of the relationships but do not necessarily represent the actual conditions in beverage receptacle-filling apparatus in which there will be only a relatively slight rise of the filling level 19 in the shown area of the field of view 15.

The first video camera 14 is connected by a cable 17 to an image processing system 18 shown in FIG. 2 with a monitor representing the field of view 15 observed by first video camera 14.

In the embodiment being discussed, the image analyzer 18 is such that it analyzes the receptacles moving from right to left on the monitor screen to determine the height of the filling level 19 in each receptacle. The analyzer monitors the receptacles for coincidence between the filling level 19 in the receptacle with a limit level 20 which is indicated by a dashed line on the monitor screen. In FIG. 2, this limit level 20 is denoted by an angular position identified by an arrow 21. This condition is detected by the image analyzer 18 which then transmits a closing signal through the central control cable 13 to the particular receptacle site 2 which at the time is in angular position 21 which is also indicated in FIG. 1.

Beyond the most basic operation discussed above of the image analyzer 18, this analyzer also may solve additional problems. FIG. 2 shows a lower level 22 indicated by a dashed line on the monitor screen. This level is to be reached at an angular position 23. When this filling level is being reached in the receptacle, the image analyzer 18 can emit a signal through the control cable to the associated receptacle site whereby the liquid controlling means is moved into a throttling mode, reducing the liquid flow rate so that the residual filling to the limit level 21 takes place more slowly and therefore can be terminated more precisely.

Image analyzer 18 furthermore is able to observe receptacles after they have reached the limit level, that is, to the left on the monitor screen of FIG. 2 of angular position 21, to monitor whether filling effectively stops at angular position 21 or if not, how much more liquid thereafter still flows into the receptacle.

Image analyzer 18 may also be used, first, to monitor the receptacles entering the field of view 15 to determine whether the filling levels 19 being reached are at all in the proper range. If they are too low, filling began too late and therefore must begin earlier. Image analyzer 18 can then reset the beginning of the filling sector F by suitable control means, not shown. If on the other hand the receptacles entering the field of view 15 are already over-filled, then the beginning of the filling sector F must be reset in the other direction. Thereby the image analyzer 18 is able to assure in automated manner that the limit level 20 is reached within the field of view 15 it is observing.

This resetting of the beginning of filling also may be implemented individually in association with the particular receptacle sites 2 in such a way that the filling level 19 is ascertained in each receptacle in the field of view 15 and in that during the next revolution of the beverage receptacle-filling apparatus 1 the opening signal for the control means of the filling component will be emitted accordingly. As a result the filling components for the particular receptacle sites 2 can be precisely controlled so that the limit level in each receptacle is reached accurately at angular position 21 marked on the monitor screen of FIG. 2. Thereupon the angular position 21 is advantageously placed precisely on the end 10 of the filling sector F which thereby will be used optimally.

The image analyzer 18 needs to know the relationship between the receptacles within field of view 15 to the receptacle sites 2 of the filling apparatus. It is able to acquire this knowledge itself by suitable image processing, such as by continuously counting the passing receptacle sites using a fixed mark on the filling apparatus 1 or by reading numerals affixed to receptacle sites 2. The significant image-processing capacity required thereby can be reduced by feeding the particular and accurate angular position of the beverage receptacle-filling apparatus 1 to the image analyzer. Such information can be gathered by suitable means outside the image analyzer 18, for instance using a gear output or light beams (omitted) that detect specific features such as projections from said filling apparatus in the course of transit, and which following analysis of angular speed and angular position will feed the corresponding positions to image analyzer 18.

Thereupon when observing the field of view 15, the image analyzer already shall know the accurate angular positions of the detected receptacles 3 and no longer needs seeking them on the monitor screen but instead can immediately seek and measure the filling level 19 at the appropriate places.

The image analyzer 18 also may be used for further purposes, for instance to recognize receptacle sites with missing receptacles, for instance burst bottles.

Furthermore when monitoring the bottles across the field of view 15, image analyzer 18, as indicated on the monitor screen of FIG. 2, is able to continuously ascertain the rise of the filling level. This is denoted in FIG. 2 by the sloping, dashed line 24 showing the level. From this information it is possible to determine the rate of receptacle filling. As a result conclusions may be drawn about the proper operation of the filling component.

To further economize on image-processing power, image analysis need only be carried out twice for each receptacle crossing field of view 15, for instance at the two angular positions 21 and 23. A sloping line 24 is then used to interpolate the likely rise of the filling level 19 to the intermediate angular positions. As a result, resorting only to a few image analyses, monitoring for reaching the limit level can be carried out even if no image analysis takes place at that particular time.

Image analyzer 18 may carry out further operations. For instance by monitoring the filling rate of the individual filling components or by monitoring proper closing, it may check their proper operation and announce faulty operations, for instance it may store such information in a list which can be assessed by a technician during the next maintenance procedure. If a filling component evinces excessive deviations, it may be shut down by preventing it from receiving opening signals for the control device or it may be shut off in some other way.

If the image analyzer 18 is used to control the beginning of filling, switching the operating mode of the beverage receptacle-filling apparatus 1 to other receptacle sizes requiring different filling times can be accomplished automatically. Furthermore, the desired nominal level also can be adjusted if required by a corresponding external input into image analyzer 18.

If for instance by switching to another receptacle size the filling times are much shifted, i.e., if the end 10 of the filling sector F is much displaced, then first video camera 14 may have to be shifted along the periphery of the filler apparatus as indicated by the arrow 25 (FIG. 1). However further, parallel video cameras also may be provided with overlapping fields of view in order to broaden the field of view 15 without loss in resolution.

In case ambient light is insufficient, illuminators 26 may be used to illuminate the field of view. These illuminators also may be required if the video camera operates with invisible light, for instance with infra-red. The selected wavelength may be optimized for receptacle and beverage transparency in order for the filling level 19 to be easily detectable by the video camera.

A second video camera 27 is stationarily mounted near the beverage receptacle-filling apparatus to observe depressurization sector E. Camera 27 is connected by a cable 28 to image analyzer 18. By corresponding image analysis, this second video camera 27 ascertains the rise in foam during depressurization of the head space in the receptacle 3. Image analyzer 18 can act accordingly on the filling apparatus 1 to prevent excessive rise in foam.

Image analyzer 18 may emit corresponding switch or control signals to the receptacle sites 2 in order to match depressurization in the depressurization sector E by corresponding control of the filling components, for instance by correspondingly turning ON or OFF the depressurization valves or by throttling them.

Second video camera 27 also may carry out a final check of the filling level in the receptacles.

A third video camera 29 is connected by a cable 30 to image analyzer 18 and observes the discharge starwheel 6, that is the region wherein the now open receptacles are being moved with high acceleration of deflection. The strong centrifugal forces may result in losing liquid by sloshing. Such a condition can be determined by the image analyzer 18 which can lower the angular speed of the beverage filling apparatus 1 accordingly. The discharge of foam also can be monitored in this region in order to appropriately match the depressurization in the receptacles.

Lastly a fourth video camera 31 is connected by a cable 32 to image analyzer 18 and serves to observe belt 9 conveying the final-sealed receptacles. In this instance, image analyzer 18 can carry out a final check, watching for proper sealing of the receptacles and ascertaining the resulting final filling level.

The emplacements of the video cameras 14, 27, 29 and 31 shown in FIG. 1 may be varied. For instance the intervals of observation may be changed, with different focal lengths being used if desired in relation to the areas to be observed. Jointly with illuminators if present, the set-up may be optimized for high-contrast representation of the filling level or of the foam. In the case of the first video camera 14 and the second video camera 27 for instance, the camera also may be mounted within the periphery of the beverage receptacle-filling apparatus 1 where the receptacle sites 2 are located in order to observe these receptacle sides in an outward direction, if the mechanical design so allows.

Figure 3A:
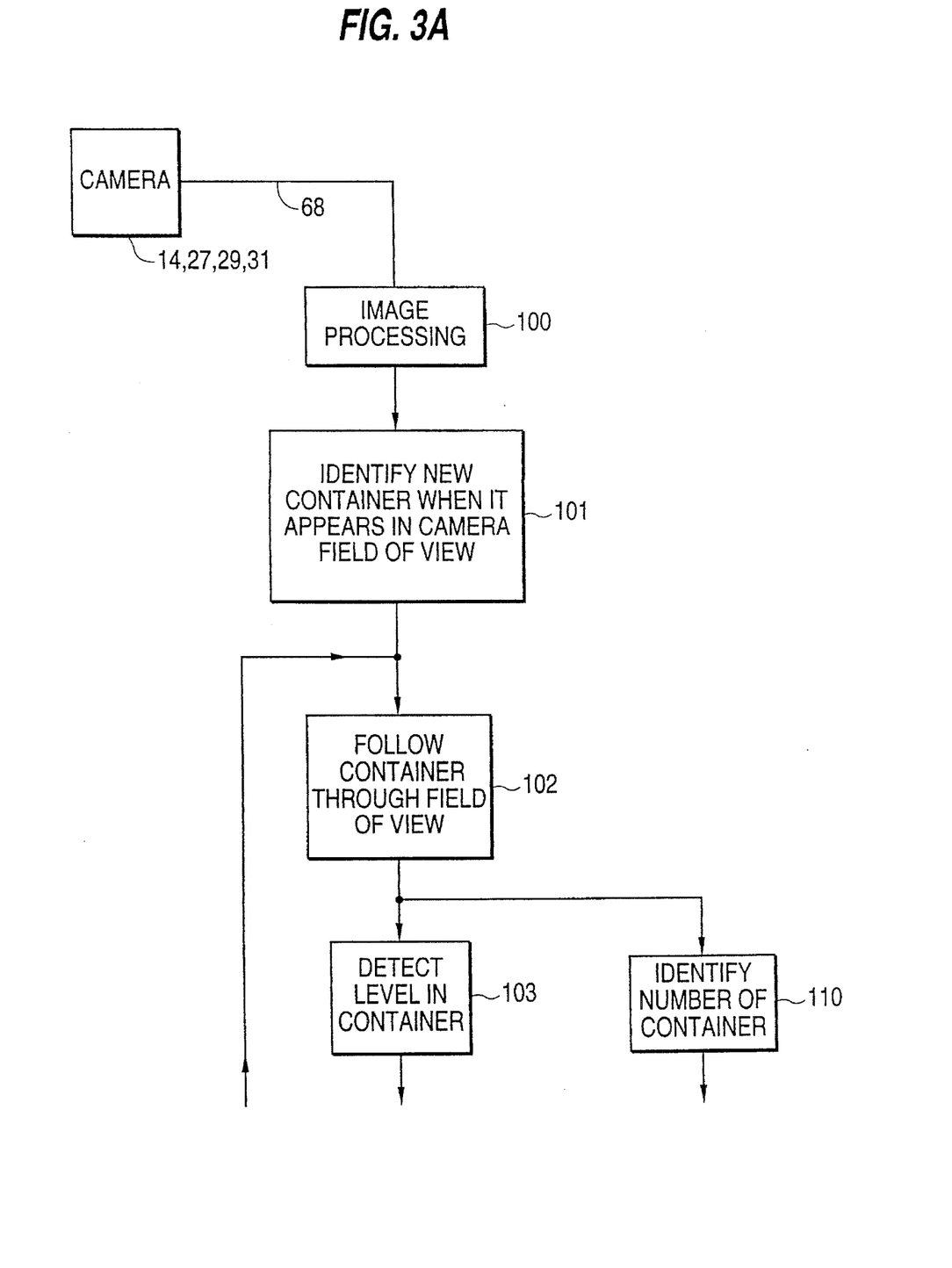
FIGS. 3A and 3B, taken together, are a flow diagram of the method performed by the apparatus.
Figure 3B:
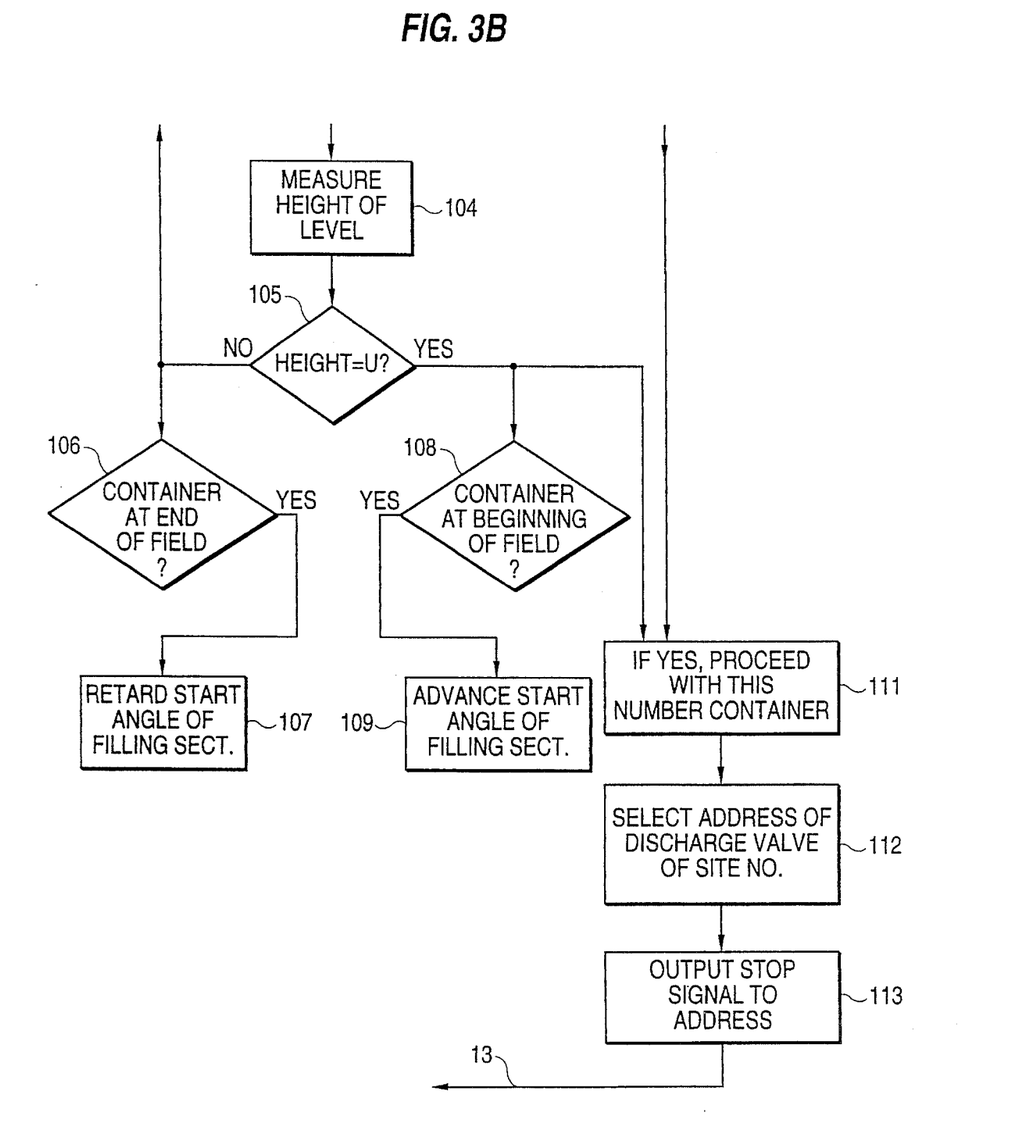

FIGS. 3A and 3B, taken together, constitute a flow chart continuing from FIG. 3A onto 3B showing the steps in the method performed by the apparatus of the invention. The flow chart describes the processes in a computer which is used as an apparatus control and which also comprises image analyzer 18. The process begins with the video signals from one or more of video cameras 14, 27, 29 and 31.

For purposes of simplicity, only signals from camera 14, which observes the end of filling sector F, will be described. However, it will be recognized that similar steps will apply to the signals from the other cameras. The computer is provided in advance with a stored value of the height U, which is equivalent to limit level 20, at which filling must be stopped. The computer is also loaded with addresses of all discharge valves which must be closed when level U is reached. In this special apparatus, the computer has image processing facilities not only for detecting and measuring the liquid level within the receptacle but also for identifying and reading a number placed somewhere on the receptacle site, e.g., painted on the container or the receptacle site.

In FIG. 3A, video signals are generated by camera 14 and are conveyed on conductors 17 to the computer which will do the image processing. In the first step 100, the image from the camera is processed in any way suitable, as known from image processing technology, so that information from the image can be extracted and processed. In step 101, each new container appearing in the field of view of the camera is recognized and identified as such for further processing. The new container is followed through the field of view, 102, and the level of liquid is detected, 103. Continuing onto FIG. 3B, the height of that liquid level is measured, 104, and the measured height is compared with the stored value of level U, step 105. If the measured height does not equal the stored value, the loop is repeated from 102.

Also, if in step 105 the answer is "no" step 106 determines whether the receptacle has reached the end of the viewing field. If the level had not reached level U but the receptacle has reached the end of the field, this would indicate that insufficient time has been allowed for filling and a signal is produced which retards the starting angle at which filling commences. This starts the filling earlier so that subsequent receptacles will be filled to level U somewhere in the middle of the viewing field, as they should be.

If step 105 produces a "yes" result, indicating that the height has reached level U, and if step 108 indicates that the receptacle is arriving at the beginning of the field already full, step 109 causes the beginning of the filling to start later, i.e., the starting angle is advanced. This shortens the filling time, again allowing the level U to be reached somewhere in the middle of the viewing field.

In parallel with step 103, the number of the site is identified in step 110 (FIG. 3A) and delivered to step 111 which also receives the "yes" response from step 105, indicating that the receptacle is properly filled. Step 111 proceeds with that number only if it received a "yes" from step 105. The number is delivered to step 112 where the bus address of the discharge valve associated with that receptacle is selected from a table. The address proceeds to step 113 where a stop signal is generated which comprises a stop command and the address from 112. The stop command on bus 13 thus reaches the address of the proper discharge valve to terminate filling of the container which has been recognized as filled to level U.

What is claimed is:

1. A beverage receptacle-filling apparatus for filling transparent receptacles (3) comprising a rotatable carrier having a plurality of spaced receptacle sites (2) on its periphery;

a plurality of filling means for filling receptacles at said receptacle sites (16);

electrically operated flow control means for individually controlling the flow of beverage from said filling means to said receptacles (3);

measuring means stationarily mounted adjacent said carrier (1) for observing the level of filling in said receptacles (3) relative to a filling limit level (20) and to transmit closing signals to said control means associated with receptacle sites (2) at which receptacles (3) have reached said limit level, said measuring means comprising a video camera (14) having a field of view (15) encompassing a plurality of receptacle sites (2), an image analyzer (18) connected to receive signals from said video camera for generating signals driving said control means, said image analyzer including means for monitoring continuously said observed receptacles crossing said field of view, measuring the level (19) to which receptacles in a plurality of angular positions are filled and, when the limit level (20) is reached in a receptacle, generating and transmitting a signal to said flow control means of the identified receptacle site to terminate filling of said receptacle.

2. An apparatus according to claim 1 wherein said image analyzer generates a throttling signal when a liquid level in a receptacle crosses at least one level (22) which is lower than said limit level (20), said control means being responsive to said throttling signal to reduce the flow rate into said receptacle.

3. An apparatus according to claim 1 wherein said image analyzer determines the angular position of a receptacle in which said limit level (20) is reached, and as a function of said angular position 21 sets an initial angle of a filling sector F.

4. An apparatus according to claim 3 wherein each said angular position (21) corresponding to the position of a receptacle in which said limit level (20) is reached is associated with an individual receptacle site (2) and wherein opening signals are transmitted to the control means associated with said site during the next revolution of the filling apparatus.

5. An apparatus according to claim 4 wherein the beginning of filling is established so that the nominal level is reached at the end (10) of filling sector F.

6. An apparatus according to claim 1 wherein said camera (14) is mounted so as to be peripherally adjustable relative to said carrier.

7. An apparatus according to claim 1 and including a plurality of cameras (14, 27, 29, 31) positioned to observe a plurality of angular zones of said carrier.

8. An apparatus according to claim 1 and including means for detecting the angular position of said carrier and for transmitting angular position information to said image analyzer.

9. An apparatus according to claim 1 wherein said image analyzer (18) detects filling components located outside the standard range with respect to the ascertained filling parameters.

10. An apparatus according to claim 1 wherein said image analyzer monitors said receptacle sites for the presence of receptacles.

11. An apparatus according to claim 1 for filling receptacles with carbonated beverages wherein said filling components (16) comprise means for depressurizing said receptacles (3) within a depressurization sector E adjoining a filling sector F of said carrier (1) said apparatus comprising at least one stationary video camera (27, 29, 31) observing receptacle sites 2 within said depressurization sector E and/or in subsequent receptacle discharge means (6, 9) of said apparatus, with image analyzers (18) to ascertain the foam picture of observed receptacles and to derive control signals to control the depressurization devices and/or the angular speed of said apparatus.

12. An apparatus according to claim 1 wherein said image analyzer comprises a monitor for displaying receptacles within said field of view and for identifying receptacle sites (2) associated with observed receptacles.

13. A computer-implemented method of controlling a beverage receptacle-filling apparatus for filling transparent receptacles comprising the steps of provding a rotatable carrier having a plurality of spaced receptacle sites on its periphery;

providing a plurality of filling means for filling receptacles at the receptacle sites, one filling means being associated with each receptacle site and having electrically operated flow control means for individually controlling the flow of beverage from the filling means to a receptacle;

stationarily positioning near the carrier a video camera with a field of view encompassing a plurality of receptacle sites, providing a computer connected to receive video signals from the video camera for analyzing image signals received from the video camera and for generating signals driving the control means, measuring with the camera and computer levels of filling in receptacles crossing the camera field of view in a plurality of angular positions relative to a filling limit level, and when the limit level is reached in a receptacle, identifying the receptacle site holding the filled receptacle and generating and transmitting a signal to the flow control means associated with the identified receptacle site to terminate filling of the filled receptacle.

* * * * *